(12) United States Patent
Wu et al.

(10) Patent No.: US 8,095,719 B2
(45) Date of Patent: Jan. 10, 2012

(54) DATA COMMUNICATION SYSTEMS AND BRIDGES

(75) Inventors: Shen-Rui Wu, Wanli Township (TW); Chiaming Hsiao, Dali (TW)

(73) Assignee: Ours Technology Inc., Jhubei (TW)

( * ) Notice: Subject to any disclaimer, the term of this patent is extended or adjusted under 35 U.S.C. 154(b) by 161 days.

(21) Appl. No.: 12/505,770

(22) Filed: Jul. 20, 2009

(65) Prior Publication Data

US 2010/0287309 A1 Nov. 11, 2010

Related U.S. Application Data

(60) Provisional application No. 61/176,447, filed on May 7, 2009.

(51) Int. Cl.
*G06F 13/36* (2006.01)
*G06F 3/00* (2006.01)

(52) U.S. Cl. .......... 710/306; 710/47; 710/311; 713/189; 713/190

(58) Field of Classification Search .................. None
See application file for complete search history.

(56) References Cited

U.S. PATENT DOCUMENTS

| | | | |
|---|---|---|---|
| 5,671,365 A * | 9/1997 | Binford et al. | 710/100 |
| 6,557,752 B1 * | 5/2003 | Yacoob | 235/375 |
| 2002/0011516 A1 * | 1/2002 | Lee | 235/380 |
| 2008/0189465 A1 * | 8/2008 | Yang | 710/316 |

FOREIGN PATENT DOCUMENTS

WO   WO 2004063836 A2 *   7/2004

OTHER PUBLICATIONS

Office Action issued Aug. 12, 2011 in corresponding Chinese Application 200910171286.9 (English Summary of Office Action attached).

* cited by examiner

*Primary Examiner* — Eron J Sorrell
*Assistant Examiner* — Dean Phan
(74) *Attorney, Agent, or Firm* — Alston & Bird LLP

(57) ABSTRACT

The present invention may be related to a bridge for communications between a first computing device and a second computing device in a data communication system. The bridge may include a first interface, a second interface and a control module. The first interface may be adapted to couple with the first computing device. The second interface may be adapted to couple with the second computing device. The control module may be configured to process a file input/output (I/O) command from the first computing device so as to allow the first computing device to have access to at least one of data or resource of the second computing device via the first and second interfaces. Moreover, the control module may further include a parser, a decoder and a micro processor. The parser may be configured to identify whether the file I/O command includes an encoded controller command and retrieve the encoded controller command from the file I/O command if the file I/O command includes an encoded controller command. The decoder may be configured to decode the encoded controller command so as to retrieve a controller command if the file I/O command includes the encoded controller command. The micro processor may be configured to respond to a first polling signal from the first computing device and a second polling signal from the second computing device when the controller command is retrieved.

15 Claims, 15 Drawing Sheets

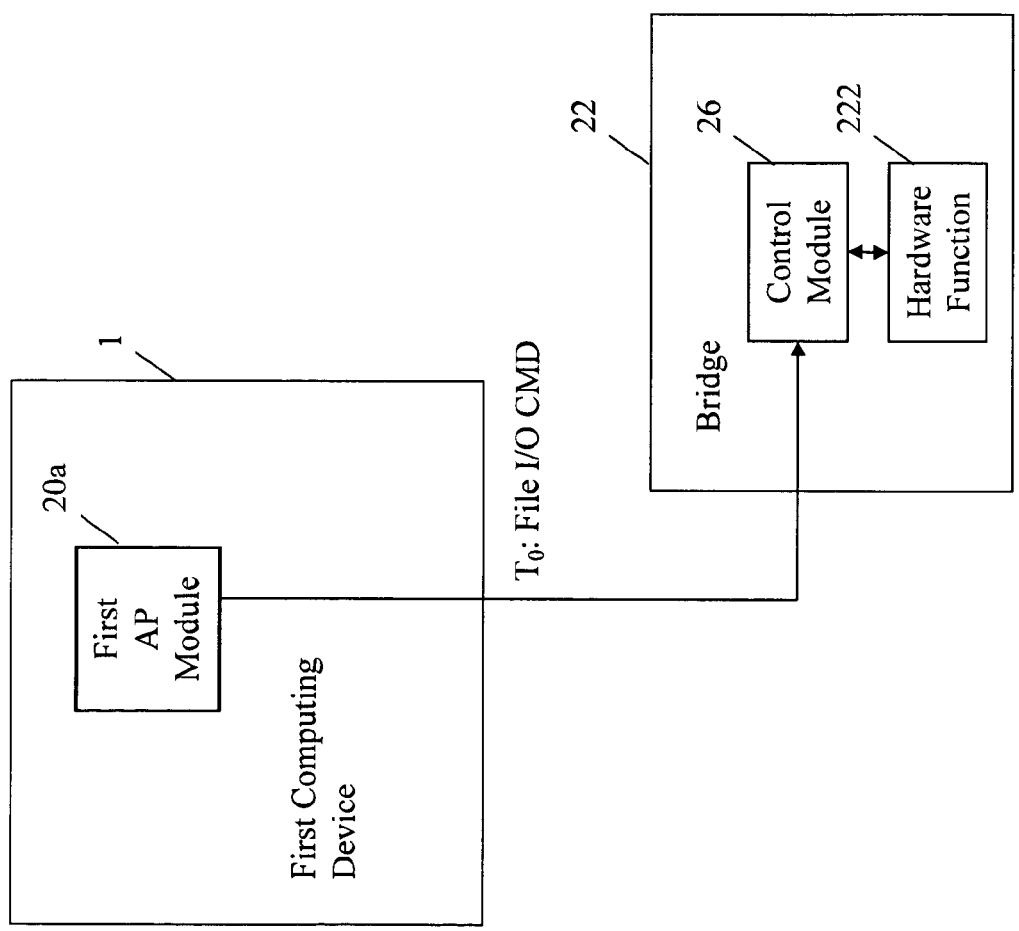

DATA COMMUNICATION SYSTEMS AND BRIDGES

CROSS-REFERENCE TO RELATED APPLICATIONS

This application claims the benefit of U.S. Provisional Application No. 61/176,447, filed May 7, 2009.

TECHNICAL FIELD

The present invention relates to data communications. More particularly, the present invention relates to bridges for data communications between computing devices.

BACKGROUND

In a conventional computing device including an operating system (OS) such as Linux, UNIX, Windows 2000, Windows XP or Windows Vista, with the help of a file system of the OS, a user may be allowed to issue commands for accessing data or function stored in a removable device attached to the computing device. The commands, including standard commands, vendor commands or both, may be converted by the file system to machine codes, which may include a bundle of instructions defined in an instruction set of the file system, and then transferred to the removable device through a driver so as to request the removable device to act as required.

However, the user of the computing device may not be allowed to access data in another computing device because the other computing device may include a different OS with a different file system and thus data access commands may be blocked in, for example, the data communication layer and may not be correctly parsed by the other computing device. Consequently, the two computing devices may not recognize one another, resulting in a failure of the direct data access.

Moreover, due to the cost or size factor, some computing devices may not include an embedded storage device such as a CD-ROM, DVD-ROM or hard disk, and thus may seek such resources from other computing devices provided with these function modules. It may therefore be desirable to have a bridge that supports data communications between computing devices.

BRIEF SUMMARY

Examples of the present invention may provide a bridge for communications between a first computing device and a second computing device in a data communication system. The bridge may include a first interface, a second interface and a control module. The first interface may be adapted to couple with the first computing device. The second interface may be adapted to couple with the second computing device. The control module may be configured to process a file input/output (I/O) command from the first computing device so as to allow the first computing device to have access to at least one of data or resource of the second computing device via the first and second interfaces.

Moreover, the control module may further include a parser, a decoder and a micro processor. The parser may be configured to identify whether the file I/O command includes an encoded controller command and retrieve the encoded controller command from the file I/O command if the file I/O command includes an encoded controller command. The decoder may be configured to decode the encoded controller command so as to retrieve a controller command if the file I/O command includes the encoded controller command. The micro processor may be configured to respond to a first polling signal from the first computing device and a second polling signal from the second computing device when the controller command is retrieved.

Examples of the present invention may also provide a bridge for communications between a first computing device and a second computing device in a data communication system. The bridge may include a parser, a decoder and a micro processor. The parser may be configured to identify whether a file input/output (I/O) command from the first computing device includes an encoded controller command, and recognize the type of the encoded controller command as one of a data command, a resource command and a control command, wherein the data command allows the first computing device to have access to data of the second computing device, the resource command allows the first computing device to have access to a resource of the second computing device, and the control command to allow the first computing device to control at least a hardware function of the bridge. The decoder may be configured to decode the encoded controller command so as to retrieve a controller command if the file I/O command includes the encoded controller command. The micro processor may be coupled to the parser to receive a file I/O command including no encoded controller command and coupled to the decoder to receive the controller command.

Some examples of the present invention may provide a data communication system. The data communication system may include a first computing device and a bridge. The first computing device may include a first application module capable of generating an encoded controller command. The encoded controller command may be included within a file input/output (I/O) command to be sent from the first computing device. The bridge may include a first interface, a second interface and a control module. The first interface may be adapted to couple with the first computing device. The second interface may be adapted to couple with a second computing device. The control module may be configured to process the file I/O command from the first computing device so as to allow the first computing device to have access to at least one of data or resource of the second computing device via the first and second interfaces.

Moreover, the control module may further include a parser, a decoder and a micro processor. The parser may be configured to identify whether the file I/O command includes the encoded controller command and retrieve the encoded controller command from the file I/O command if the file I/O command includes the encoded controller command. The decoder may be configured to decode the encoded controller command so as to retrieve a controller command if the file I/O command includes the encoded controller command. The micro processor may be configured to respond to a first polling signal from the first computing device and a second polling signal from the second computing device when the controller command is retrieved.

Other examples of the present invention may also provide a data communication system. The data communication system may include a first computing device and a bridge. The first computing device may include a first application module capable of generating an encoded controller command. The encoded controller command may be included within a file input/output (I/O) command to be sent from the first computing device. The bridge may include a parser, a decoder and a micro processor. The parser may be configured to identify whether the file I/O command from the first computing device includes the encoded controller command and recognize the type of the encoded controller command as one of a data command, a resource command and a control command, wherein the data command allows the first computing device to have access to data of a second computing device, the resource command allows the first computing device to have access to a resource of the second computing device, and the control command to allow the first computing device to control at least a hardware function of the bridge. The decoder may be configured to decode the encoded controller command so as to retrieve a controller command if the file I/O command includes the encoded controller command. Moreover, the micro processor may be coupled to the parser to receive the file I/O command including no encoded controller command and coupled to the decoder to retrieve the controller command.

Other examples of the present invention may also provide a method for communications in a data communication system comprising a first computing device, a second computing device and a bridge coupled between the first and the second computing devices via a first and a second interfaces of the bridge, respectively. The method may include generating a controller command, encoding the controller command to generate an encoded controller command, and generating a file input/output (I/O) command including the encoded controller command. The encoded controller command includes one of a data command, a resource command and a control command, wherein the data command allows the first computing device to have access to data of the second computing device, the resource command allows the first computing device to have access to a resource of the second computing device, and the control command to allow the first computing device to control at least a hardware function of the bridge.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings:

FIG. 7 is a schematic diagram illustrating a control process between a first computing device and a bridge according to an example of the present invention;

DETAILED DESCRIPTION

Reference will now be made in detail to the present examples of the invention, examples of which are illustrated in the accompanying drawings. Wherever possible, the same reference numbers will be used throughout the drawings to refer to the same or like parts.

Figure 1:
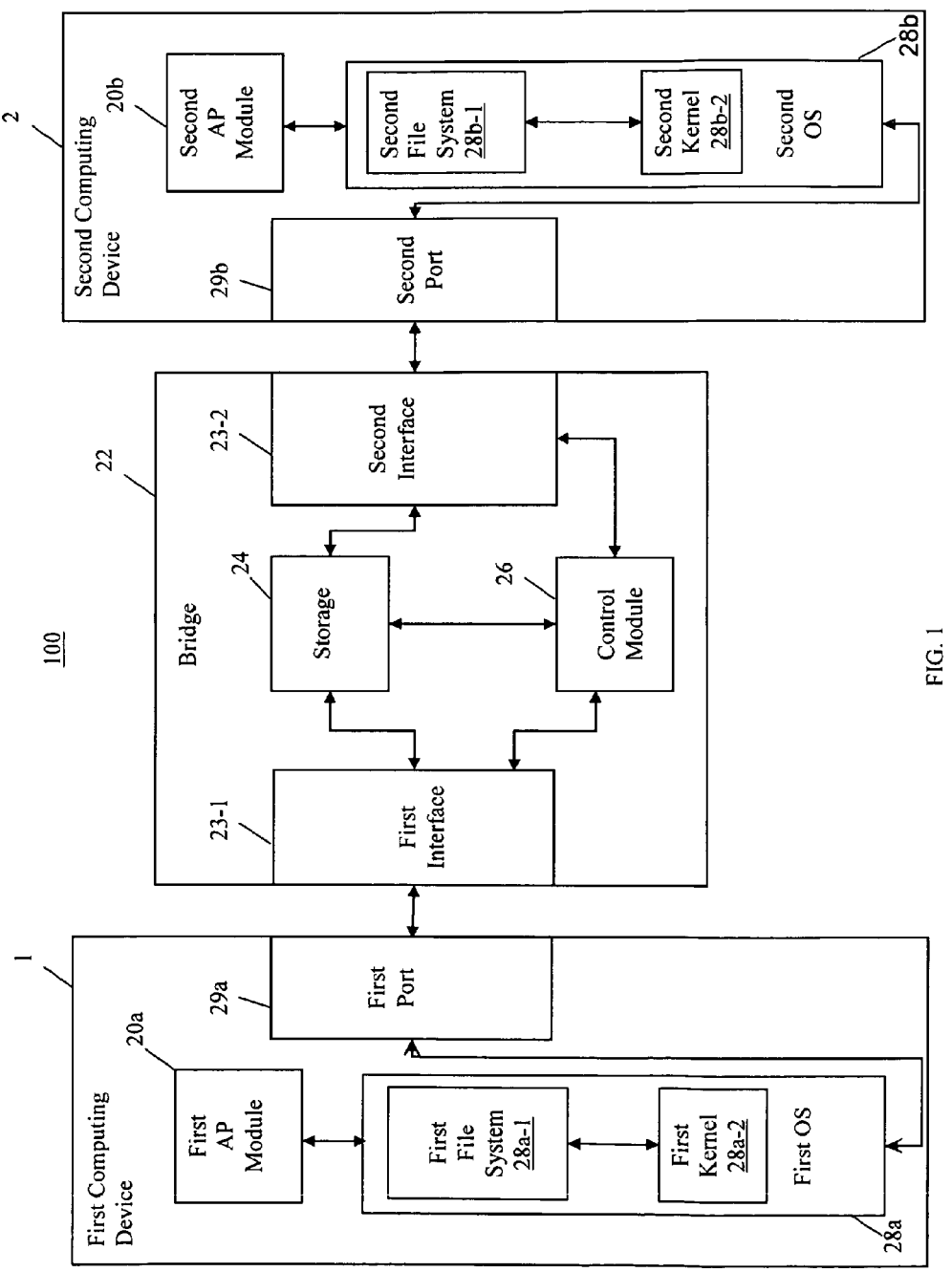
FIG. 1 is a schematic block diagram illustrating a data communication system according to an example of the present invention.

FIG. 1 is a block diagram illustrating a data communication system 100 according to an example of the present invention. Referring to FIG. 1, the data communication system 100 may include a first computing device 1, a second computing device 2, and a bridge 22 between the first and second computing devices 1 and 2. The first computing device 1 may include but is not limited to one of a server, a main frame, a personal computer, a laptop computer, a notebook computer and a smart phone. Moreover, the first computing device 1 may include a first application (AP) module 20a, a first communication port 29a and a first operating system (OS) 28a that further includes a first file system 28a-1 and a first kernel 28a-2. The first communication port 29a may include one of a "Universal Serial Bus" (USB) port that functions to serve as a USB interface, an "Institute of Electrical and Electronics Engineers" (IEEE) 1394 port, a "Peripheral Component Interconnect" (PCI) Express port and a "Serial Advanced Technology Attachment" (SATA) port to electrically couple with a first interface 23-1 of the bridge 22.

Similarly, the second computing device 2 may include but is not limited to one of a server, a main frame, a personal computer, a laptop computer, a notebook computer and a smart phone. Moreover, the second computing device 2 may include a second AP module 20b, a second communication port 29b and a second OS 28b that further includes a second file system 28b-1 and a second kernel 28b-2. The second communication port 29b may include one of a USB port, an IEEE 1394 port, a PCI Express port and a SATA port to electrically couple with a second interface 23-2 of the bridge 22.

The first and second AP modules 20a and 20b may be implemented in hardware or software, in which the former may be more advantageous in view of operation speed while the latter may be more cost effective in view of design complexity. If implemented in hardware, the first and second AP modules 20a and 20b may be fabricated in an integrated chip (IC). If implemented in software, the first and second AP modules 20a and 20b may be installed in the first and second computing devices 1 and 2, respectively. In one example, the first AP module 20a may include a driver or programming codes installed in the first computing device 1. Similarly, the second AP module 20b may include a driver or programming codes installed in the second computing device 2. The first computing device 1 may be configured to execute the first AP module 20a and the first OS 28a, and the second computing device 2 may be configured to execute the second AP module 20b and the second OS 28b. The first and second AP modules 20a and 20b may be electrically coupled with the bridge 22 via the first communication port 29a and the first interface 23-1 and via the second communication port 29b and the second interface 23-2, respectively.

The bridge 22 may include storage 24 and a control module 26 in addition to the first and second interfaces 23-1 and 23-2. The storage 24 may include at least one of a hard disk, random access memory, flash or read-only memory. In one example, the bridge 22 may include a removable electronic device, such as a USB device, which is attachable to the first and second computing devices 1 and 2 via the first and second interfaces 23-1 and 23-2, respectively.

Figure 2A:
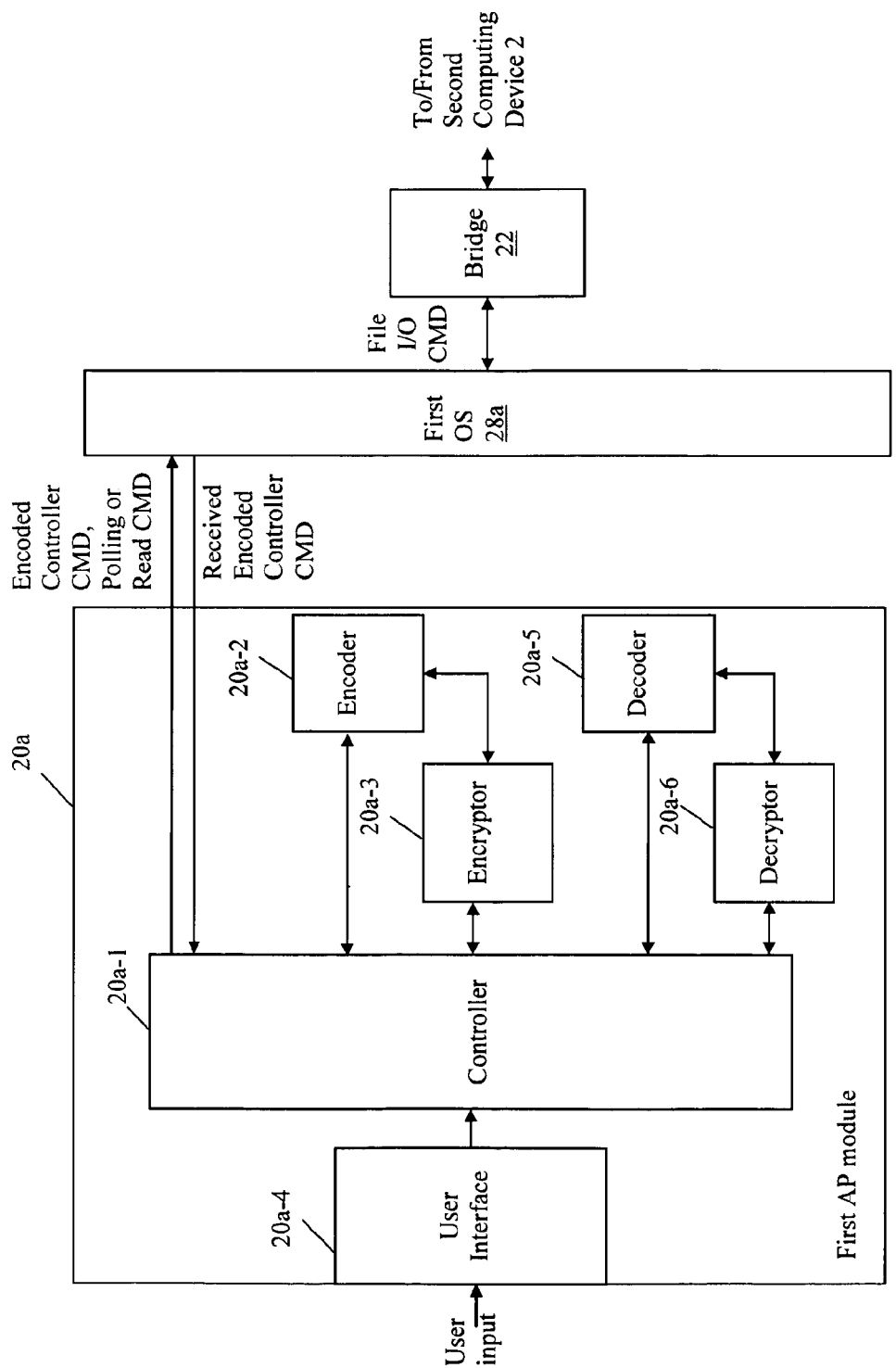
FIG. 2A is a schematic block diagram of a first application module illustrated in FIG. 1.

FIG. 2A is a schematic block diagram of the first AP module 20a illustrated in FIG. 1 according to an example of the present invention. Although not illustrated, the second AP module 20b may include a structure similar to that of the first AP module 20a because the roles of the first and second computing devices 1 and 2 may be interchangeable in the data communication system 100. Referring to FIG. 2A, the first AP module 20a may include a controller 20a-1, an encoder 20a-2, an encryptor 20a-3 and a user interface (UI) 20a-4. A user may start a communication process between the first and second computing devices 1 and 2 by sending a user input to one of the first and second computing devices 1 and 2. The communication process may include, for example, a data access process, a resource access process and a control access process. The data access process may include a reading or writing process between the first and second computing devices 1 and 2 or between the first computing device 1 or second computing device 2 and the bridge 22. The resource access process may enable the first computing device 1 to use the resources or desired functions of the second computing device 2, and vice versa. The control access process may enable the first computing device 1 or second computing device 2 to control the bridge 22.

In the present example, the UI 20a-4 of the first AP module 20a may receive a user input from a user. The controller 20a-1 may be configured to schedule a data communication process for the first computing device 1, the bridge 22 and the second computing device 2 based on the user input at the UI 20a-4. Specifically, the controller 20a-1 may generate a controller command in response to the user input at the UI 20a-4 and send the controller command to the encoder 20a-2 or the encryptor 20a-3, depending on the security requirement of the data communication process. For example, if the data communication process requires a normal or relatively low security level, the controller 20a-1 may send the controller command to the encoder 20a-2 without encrypting the controller command. If, however, the data communication process requires a relatively high security level, the controller 20a-1 may send the controller command to the encryptor 20a-3 before or after the controller command is encoded in the encoder 20a-2. The encryptor 20a-3 may encrypt the controller command with a cryptographic key such as a public key or private key, which may be predetermined and known to the first and second AP modules 20a and 20b.

The controller command may include one of a resource command, a control command and a data command, which correspond to the resource access process, control access process and data access process, respectively. The resource command may be sent via the bridge 22 to the second AP module 20b of the second computing device 2 so that the first computing device 1 may get access to a desired resource or function of the second computing device 2. The control command may be used to control the hardware functions or configuration parameters of the bridge 22. For example, by sending a control command, the first computing device 1 may request the bridge 22 to turn on an LED diode such as an indication light thereof. The data command may include one of a read command for the first computing device 1 to read data from the second computing device 2 and a write command to write data from the first computing device 1 to the second computing device 2.

In one example, referring back to FIG. 1, the resources of the second computing device 2 may include peripheral or input/output (I/O) devices controlled by the kernel 28b-2 of the second OS 28b or the second file system 28b-1 of the second OS 28b. Furthermore, the resources of the second computing device 2 may include internal processes handled by the second OS 28b.

Referring again to FIG. 2A, the encoder 20a-2 may be configured to encode a controller command, either encrypted or not, with an encoding parameter, which may be embedded in the encoder 20a-2 or configurable by the first AP module 20a. The encryptor 20a-3 may be configured to encrypt a controller command, either encoded or not, with a cryptographic key known to the control module 26 of the bridge 22 and then send the encrypted controller command to the encoder 20a-2.

The first AP module 20a may send an encoded controller command to the first file system 28a-1 of the first OS 28a. Based on the encoded controller command, the first file system 28a-1 of the first OS 28a may generate a file input/output (IO) command including the encoded controller command. Thereafter, the first kernel 28a-1 may send the file I/O command to the bridge 22 via the first communication port 29a and the first interface 23-1.

Referring back to FIG. 1, the controller (by reference to the controller 20a-1) of the second AP module 20b may initiate a polling process in the second OS 28b by periodically generating a request signal or a polling signal and sending the signal to the bridge 22. The controller of the second AP module 20b may check a flag of a response packet generated by the bridge 22 so as to identify if the bridge 22 receives a file I/O command from the first computing device 1 that includes an encoded controller command. If it is confirmed, the bridge 22 may retrieve the controller command from the file I/O command and buffer the controller command in the storage 24. Furthermore, the bridge 22 may inform the second computing device 2 to read the controller command by turning on the flag in a response packet as a response to a polling signal. The controller of the second AP module 20b may then initiate a file read process and read the retrieved controller command in the storage 24.

In one example, the controller command may include a data command for moving data from the second computing device 2 to the storage 24 of the bridge 22 for the first computing device 1 to read. The second AP module 20b may initiate a file write process so that the second OS 28b may send the data to the storage 24. Similarly, the controller 20a-1 of the first AP module 20a may periodically poll the bridge 22 so as to identify if the bridge 22 receives the data from the second computing device 2. If it is confirmed, the first AP module 20a may initiate a file read process to read the data.

Figure 2B:
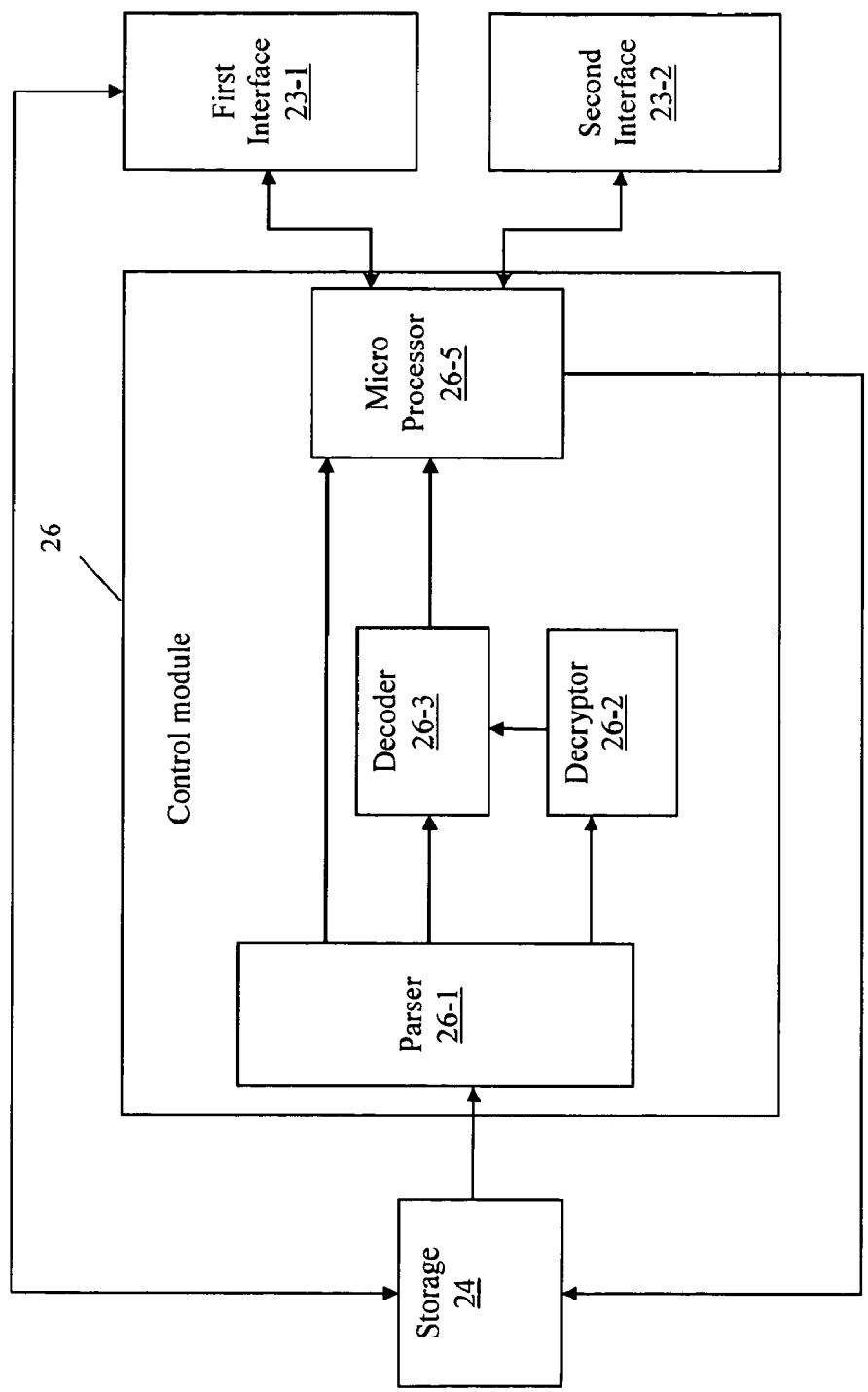
FIG. 2B is a schematic block diagram of a control module illustrated in FIG. 1.

FIG. 2B is a schematic block diagram of the control module 26 illustrated in FIG. 1 according to an example of the present invention. Referring to FIG. 2B, the control module 26 may include a parser 26-1, a decryptor 26-2, a decoder 26-3 and a micro processor 26-5. When a file I/O command is received, the parser 26-1 may parse the file I/O command and identify if the file I/O command includes an encoded controller command. If the file I/O command includes no controller command, which means that the first computing device 1 requires a data access between itself and the bridge 22, the file I/O command may be sent to the microprocessor 26-5. The microprocessor 26-5 may respond to the first computing device 1 via the first interface 23-1 that the file I/O command is received so that the first computing device 1 may initiate a data read or data write process.

If the file I/O command includes an encoded controller command, the parser 26-1 may identify the command type of the encoded controller command, i.e., a control command, a data command or a resource command and retrieve the encoded controller command. The encoded controller command may be sent to the decoder 26-3 and be decoded there so as to retrieve the controller command. In one example, if the file I/O command further includes an encrypted controller command, the file I/O command may be sent to the decryptor 26-2 for decryption with the cryptographic key, and then sent to the decoder 26-3 for decoding using the encoding parameter, thus retrieving the controller command.

In the case of a control command, the control command may be sent to the microprocessor 26-5 and a control access process may be initiated to allow the first computing device 1 to control the bridge 22. In the case of a data command, the data command may be sent to the second computing device 2 and a data access process between the first and second computing devices 1 and 2 may be initiated. In the case of a resource command, the resource command may be sent to the second computing device 2 and a resource access process may be initiated to allow the first computing device 1 to use the resources or functions of the second computing device 2.

Referring back to FIG. 2A, the first AP module 20a may optionally further include a decoder 20a-5 and a decryptor 20a-6. The decoder 20a-5 may be configured to decode an encoded controller command in a file I/O command sent from the second computing device 2 via the bridge 22. The decryptor 20a-6 may be configured to decrypt a decoded controller command if the controller command has been encrypted. Moreover, since the second AP module 20b may be similar in structure to the first AP module 20a, an encoded controller command in a file I/O command sent from the first computing device 1 via the bridge 22 may be decoded and, if necessary, decrypted in the second computing device 2 instead of being decoded and decrypted in the bridge 22.

Figure 3:
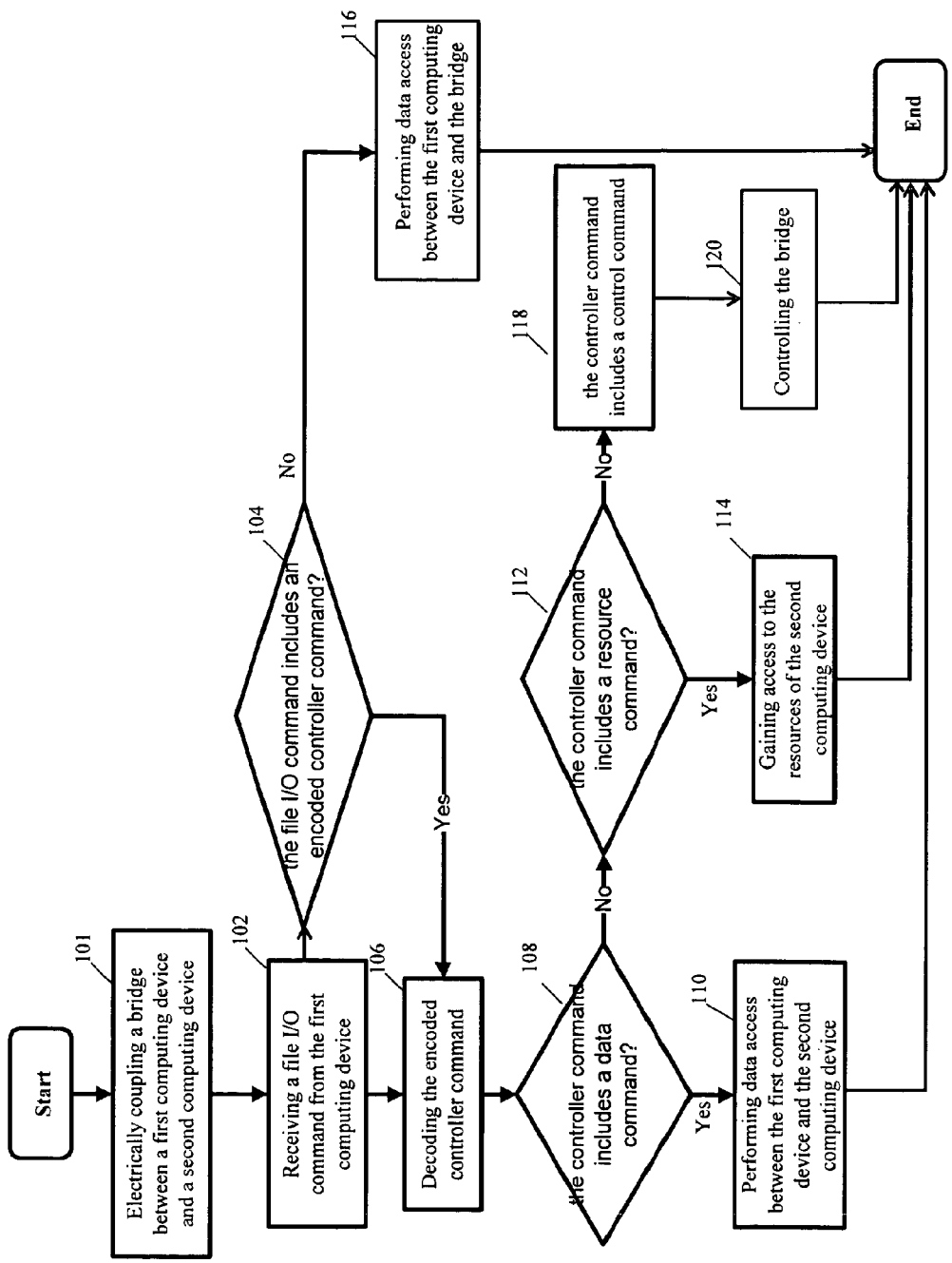
FIG. 3 is a flow diagram illustrating a method for data communications in the system illustrated in FIG. 1 according to an example of the present invention.

FIG. 3 is a flow diagram illustrating a method for data communications in the system 100 illustrated in FIG. 1 according to an example of the present invention. Referring to FIG. 3, the bridge 22 may be electrically coupled, either in a wired or wireless manner, between the first and second computing devices 1 and 2 at step 101. Next, a file I/O command from the first computing device 1 may be received by the bridge 22 and stored in the storage 24 thereof at step 102.

At step 104, the bridge 22 may identify whether the file I/O command includes an encoded controller command. Specifically, also referring to FIG. 2B, the parser 26-1 of the control module 26 in the bridge 22 may parse the file I/O command for such identification.

If the file I/O command includes no encoded controller command, a data access process such as a data read or a data write process may be performed between the first computing device 1 and the bridge 22 at step 116.

If the file I/O command includes an encoded controller command, at step 106, the file I/O command may be decoded and, if necessary, decrypted so that the controller command may be retrieved. Specifically, also referring to FIG. 2B, the decoder 26-3 of the control module 26 in the bridge 22 may decode the file I/O command and, if necessary, the decryptor 26-2 may decrypt the file I/O command for retrieving the controller command. As an alternative, also referring to FIG. 2A, the second AP module 20b similar in structure to the first AP module 20a illustrated in FIG. 2A may decode and, if necessary, decrypt the file I/O command to retrieve the controller command.

At step 108, it may be identified whether the controller command includes a data command. Also referring to FIG. 2B, the parser 26-1 may parse the controller command so as to identify the command type of the controller command. The command type may include one of a data command, a resource command and a control command.

If the controller command includes a data command, at step 110, a data access process may be performed between the first and second computing devices 1 and 2.

At step 112, it may be identified whether the controller command includes a resource command. If a YES result is obtained at step 114, the first computing device 1 may gain access to the resources of the second computing device 2 via the bridge 22.

If a NO result is yielded, at step 118, it may be identified that the controller command includes a control command to allow the first computing device 1 to control the bridge 22 at step 120.

Figure 4A:
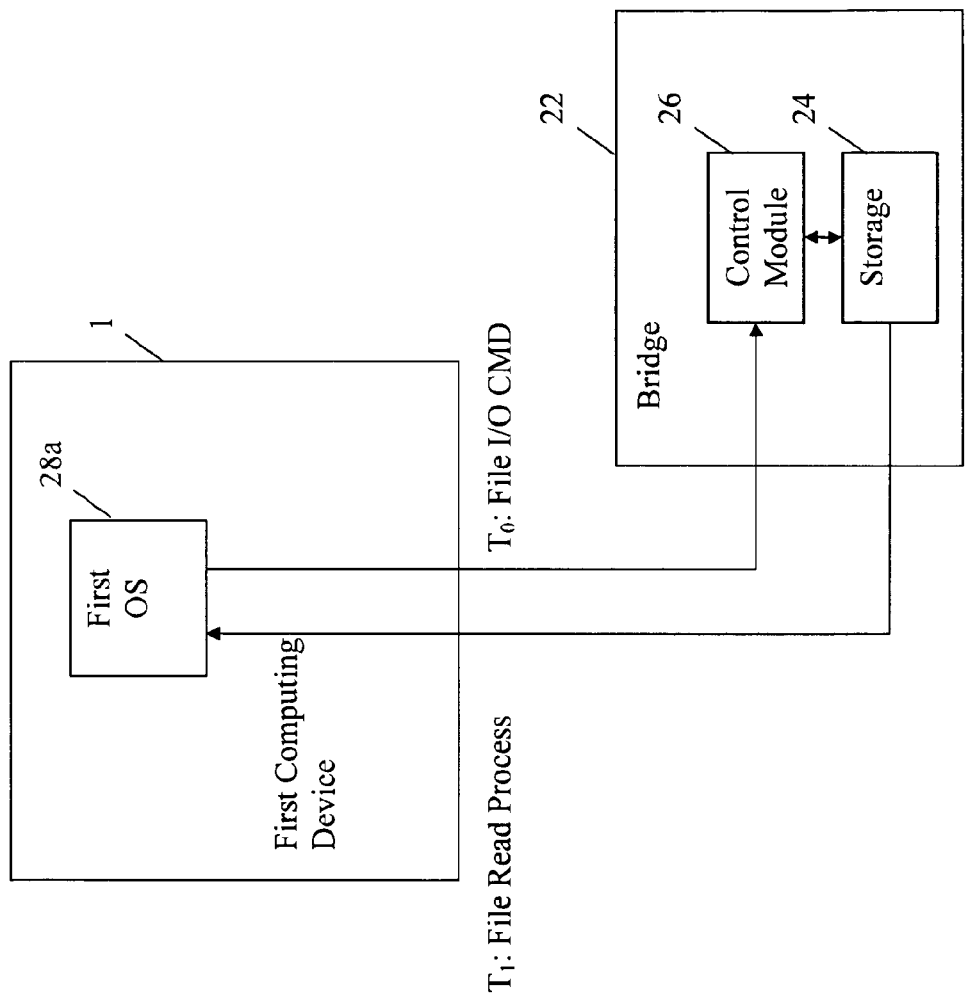
FIG. 4A is a schematic diagram illustrating a data access process between a first computing device and a bridge according to an example of the present invention.

FIG. 4A is a schematic diagram illustrating a data access process between the first computing device 1 and the bridge 22 according to an example of the present invention. Referring to FIG. 4A, for reading data from the bridge 22, the first computing device 1 may generate a file I/O command at a time point $T_0$. By parsing the file I/O command from the first computing device 1, the bridge 22 may identify that the file I/O command includes no encoded controller command and includes a read command for reading data stored in the storage 24. Subsequent to the file I/O command, a file read process may be initiated by the first OS 28a at a time point $T_1$ so as to read data from the storage 24.

Figure 4B:
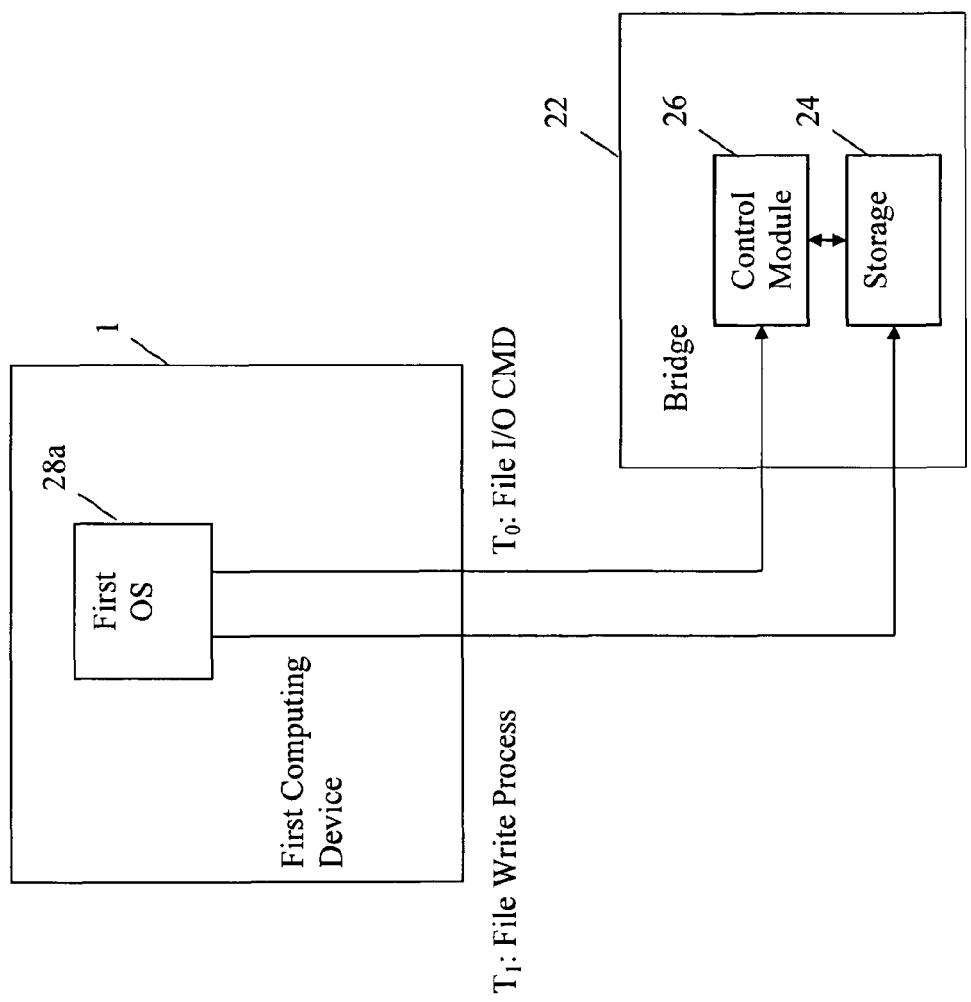
FIG. 4B is a schematic diagram illustrating a data access process between a first computing device and a bridge according to another example of the present invention.

FIG. 4B is a schematic diagram illustrating a data access process between the first computing device 1 and the bridge 22 according to another example of the present invention. Referring to FIG. 4B, for writing data to the bridge 22, the first computing device 1 may generate a file I/O command at a time point $T_0$. By parsing the file I/O command from the first computing device 1, the bridge 22 may identify that the file I/O command includes no encoded controller command and includes a write command for writing data into the storage 24. Subsequent to the file I/O command, a file write process may be initiated by the first OS 28a at a time point $T_1$ so as to write data to the storage 24.

Figure 5A:
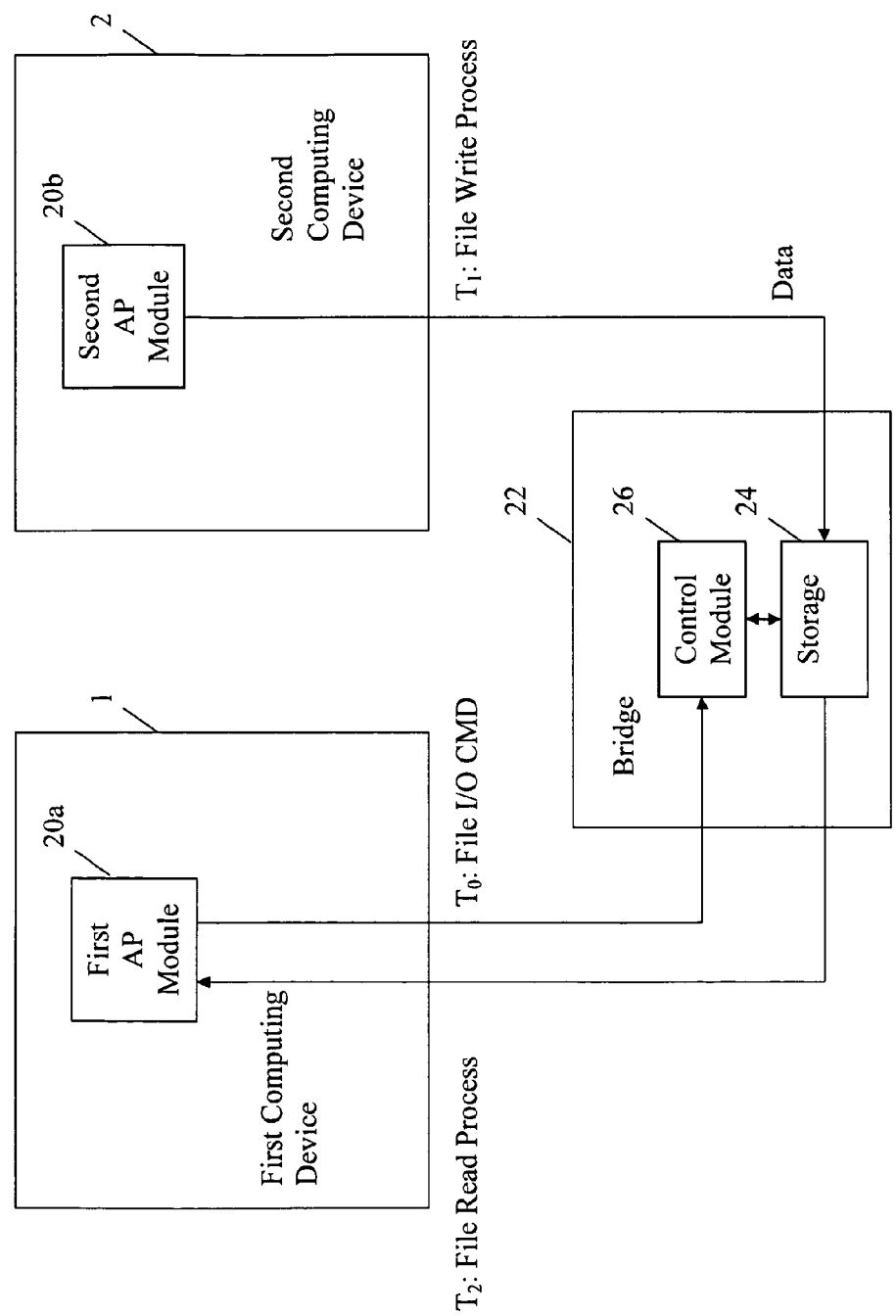
FIG. 5A is a schematic diagram illustrating a data access process between a first and a second computing devices according to an example of the present invention.

FIG. 5A is a schematic diagram illustrating a data access process between the first and second computing devices 1 and 2 according to an example of the present invention. Referring to FIG. 5A, for reading data from the second computing device 2, the first computing device 1 may generate a file I/O command including an encoded controller command at a time point $T_0$. By parsing the file I/O command from the first computing device 1, the bridge 22 may identify that the controller command is a data command. Based on the data command, the bridge 22 may respond to a second polling signal from the second computing device 2 and request the second computing device 2 to send data to the storage 24. A file write process may be initiated by the second AP module 20b of the second computing device 2 at a time point $T_1$. When the data are stored in the storage 24, the bridge 22 may respond to a first polling signal from the first computing device 1 and inform the first computing device 1 of the data. The first AP module 20a of the first computing device 1 may initiate a file read process at a time point $T_2$ to read the data from the storage 24.

Figure 5B:
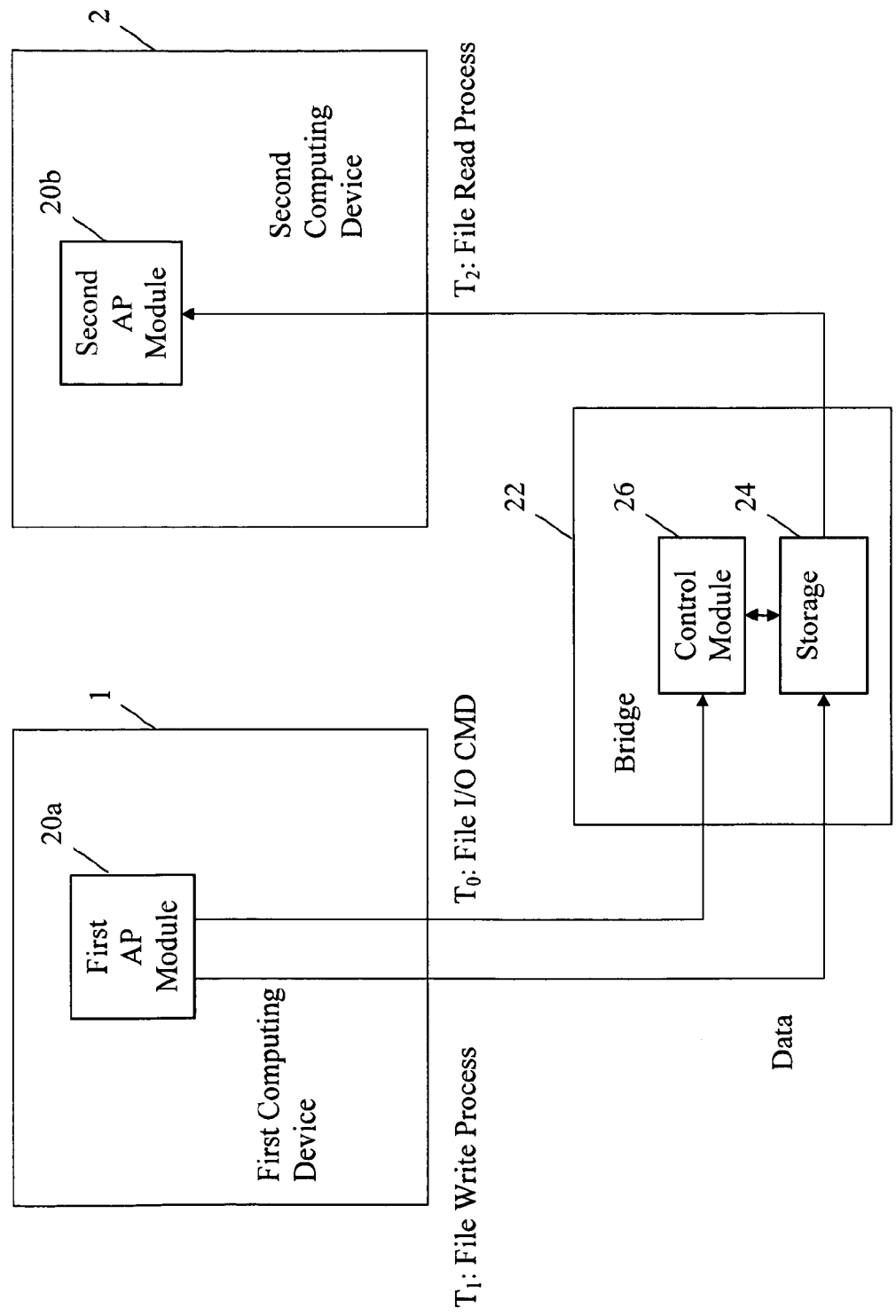
FIG. 5B is a schematic diagram illustrating a data access process between a first and a second computing devices according to another example of the present invention.

FIG. 5B is a schematic diagram illustrating a data access process between the first and second computing devices 1 and 2 according to another example of the present invention. Referring to FIG. 5B, for writing data to the second computing device 2, the first computing device 1 may generate a file I/O command including an encoded controller command at a time point $T_0$. By parsing the file I/O command from the first computing device 1, the bridge 22 may identify that the controller command is a data command. Based on the data command, the bridge 22 may respond to a first polling signal from the first computing device 1 and request the first computing device 1 to send data to the storage 24. A file write process may be initiated by the first AP module 20a of the first computing device 1 at a time point $T_1$. When the data are stored in the storage 24, the bridge 22 may respond to a second polling signal from the second computing device 2 and inform the second computing device 2 of the data. The second AP module 20b of the second computing device 2 may initiate a file read process at a time point $T_2$ in order to read the data from the storage 24.

Figure 6A:
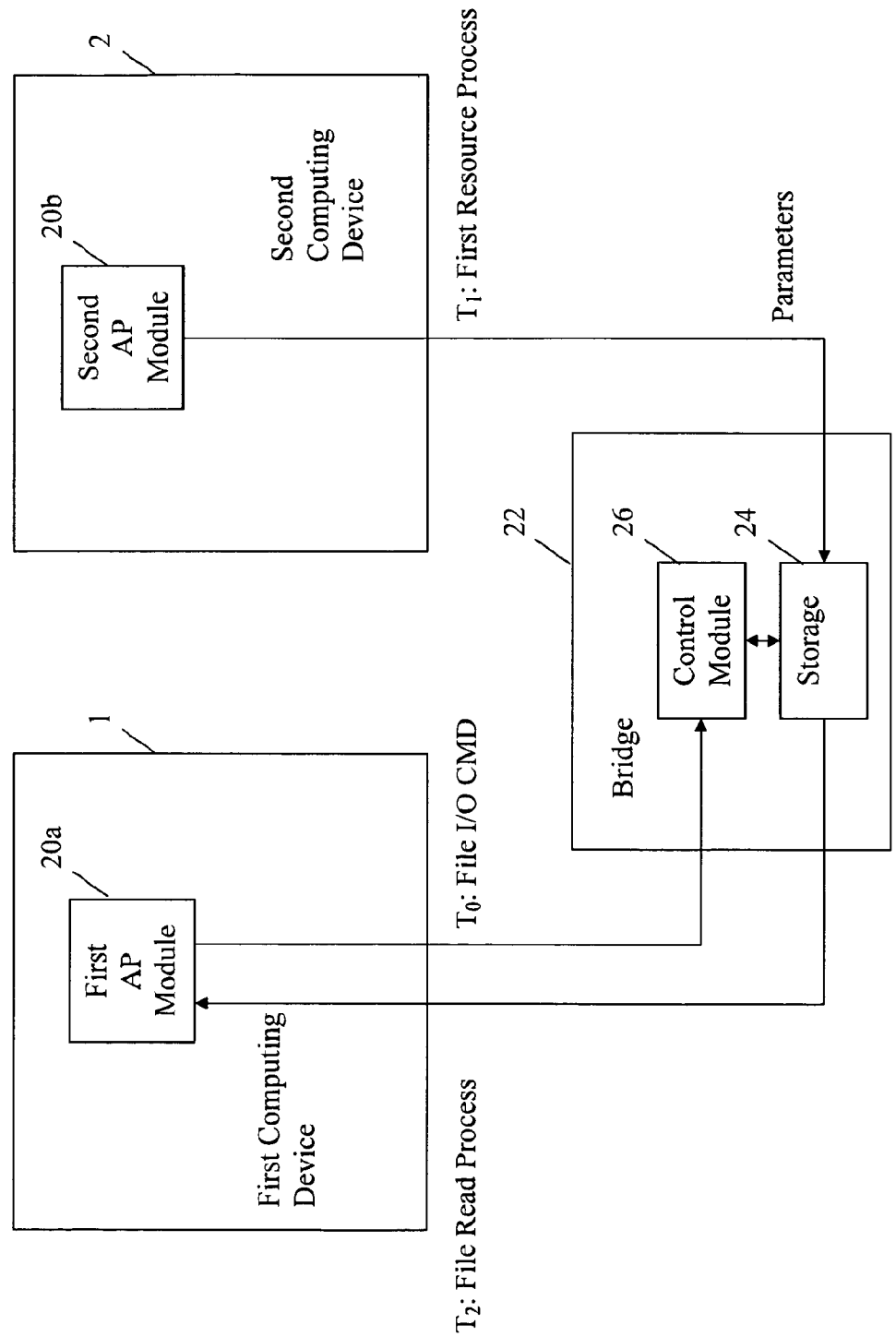
FIG. 6A is a schematic diagram illustrating a resource access process between a first and a second computing devices according to an example of the present invention.

FIG. 6A is a schematic diagram illustrating a resource access process between the first and second computing devices 1 and 2 according to an example of the present invention. Referring to FIG. 6A, the resource access process may be similar to the data access process described and illustrated with reference to FIG. 5A except that, for example, a first resource process may be initiated by the second AP module 20b at a time point $T_1$.

To gain access to the resources of the second computing device 2, in the present example the first computing device 1 may read the parameters of a desired function device such as a wireless network interface card (wireless NIC) of the second computing device 2. Similar to the data access (read) process in FIG. 5A, the first computing device 1 may generate a file I/O command including an encoded controller command at a time point $T_0$. By parsing the file I/O command from the first computing device 1, the bridge 22 may identify that the controller command included in the file I/O command is a resource command. Based on the resource command, the bridge 22 may respond to a second polling signal from the second computing device 2 and inform the second computing device 2 that a resource command for reading the parameters of the wireless NIC is stored in the storage 24. The first resource process may then be initiated by the second AP module 20b of the second computing device 2 at the time point $T_1$, which may include a file write process for the second AP module 20b to write the parameters of the wireless NIC to the storage 24.

When the parameters are stored in the storage 24, the bridge 22 may respond to a first polling signal from the first computing device 1 and inform the first computing device 1 of the parameters. The first AP module 20a may initiate a file read process at a time point $T_2$ in order to read the parameters from the storage 24.

Figure 6B:
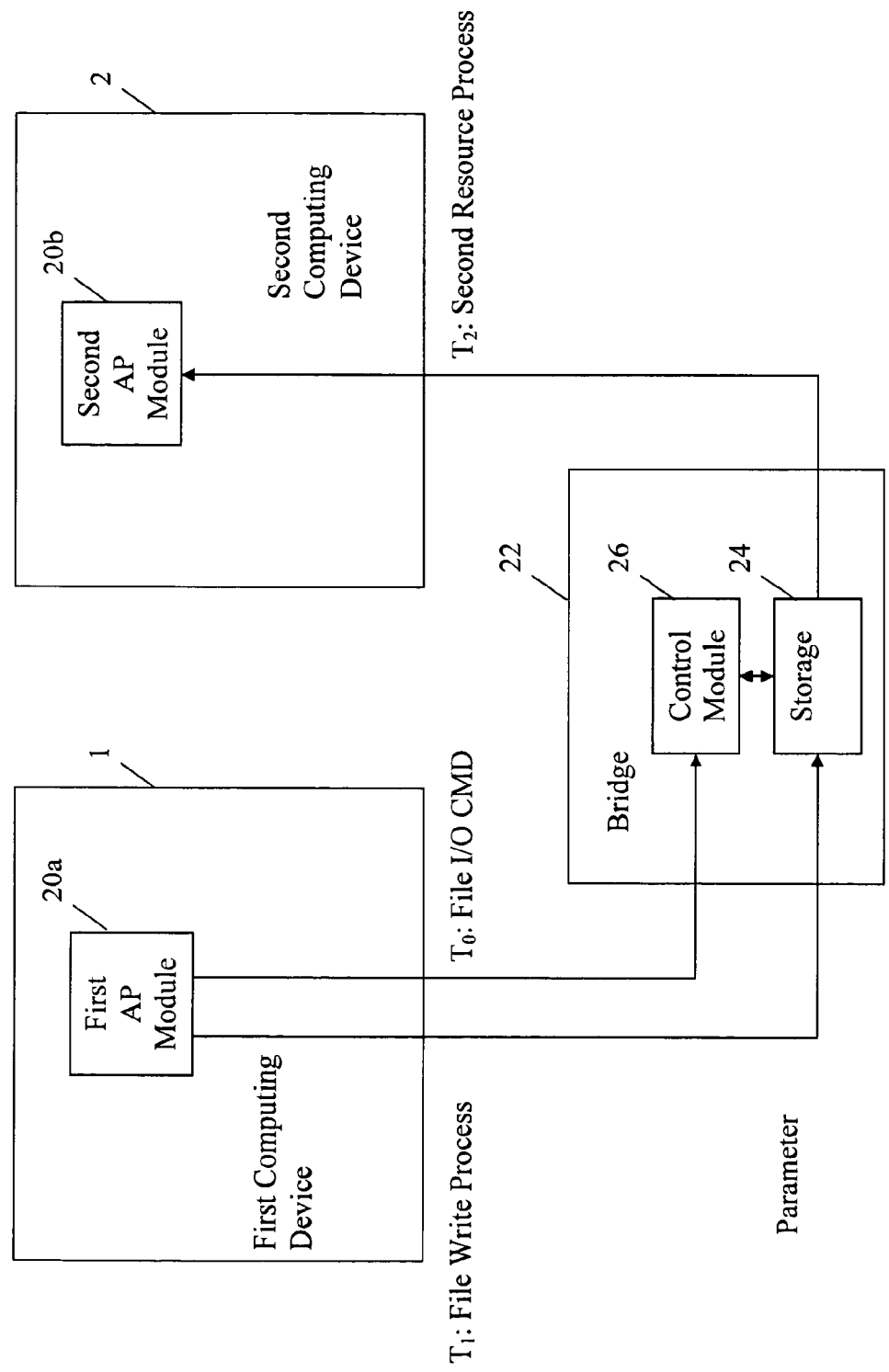
FIG. 6B is a schematic diagram illustrating a resource access process between a first and a second computing devices according to another example of the present invention.

FIG. 6B is a schematic diagram illustrating a resource access process between the first and second computing devices 1 and 2 according to another example of the present invention. Referring to FIG. 6B, the resource access process may be similar to the data access process described and illustrated with reference to FIG. 5B except that, for example, a second resource process may be initiated by the second AP module 20b at a time point $T_2$.

To gain access to the resources of the second computing device 2, in the present example the first computing device 1 may send desired or predetermined parameters for a function device of the second computing device 2, which may be used to, for example, setup the time elapsed for entering a sleeping mode of a function device, such as a monitor or a bluetooth module, of the second computing device 2. Similar to the data access (write) process in FIG. 5B, the first computing device 1 may generate a file I/O command including an encoded controller command at a time point $T_0$. By parsing the file I/O command from the first computing device 1, the bridge 22 may identify that the controller command is a resource command. At the time point $T_1$, the file write process may be initiated by the first AP module 20a to write the parameter to the storage 24.

Based on the resource command, the bridge 22 may respond to a second polling signal from the second computing device 2 and inform the second computing device 2 that a resource command for writing the parameter of the function device is stored in the storage 24. The second resource process may then be initiated by the second AP module 20b at the time point $T_2$, which may include a file read process for the second AP module 20b to read the parameter from the storage 24, and then write the parameters to the related function device.

FIG. 7 is a schematic diagram illustrating a control process between the first computing device 1 and the bridge 22 according to an example of the present invention. Referring to FIG. 7, for controlling a hardware function 222 of the bridge 22 or configuring a parameter of the bridge 22, the first computing device 1 may generate a file I/O command at a time point $T_0$. By parsing the file I/O command from the first computing device 1, the bridge 22 may identify that the controller command included in the file I/O command is a control command for controlling the hardware functions or configuration parameters of the bridge 22, for example, to turn on the LED diode. Based on the controller command, a control process may be initiated in the bridge 22 by the control module 26 at a time point $T_1$, and the LED diode of the bridge 22 may be turned on.

Figure 8A:
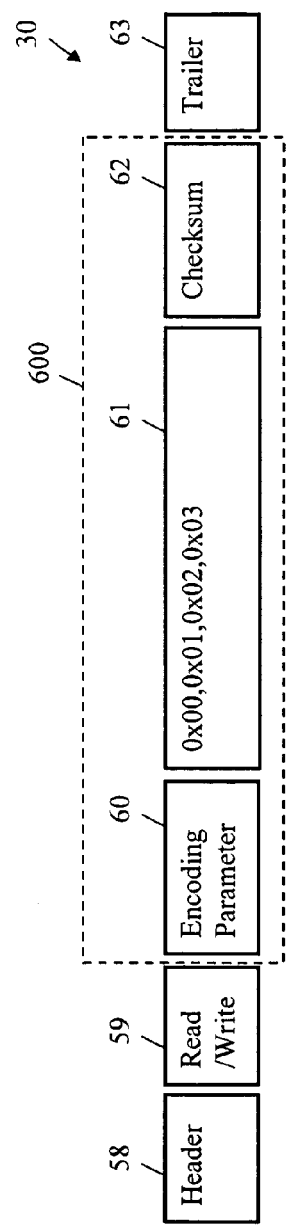
FIGS. 8A to 8C are diagrams illustrating a method of generating a file I/O command including a command section according to an example of the present invention.
Figure 8B:
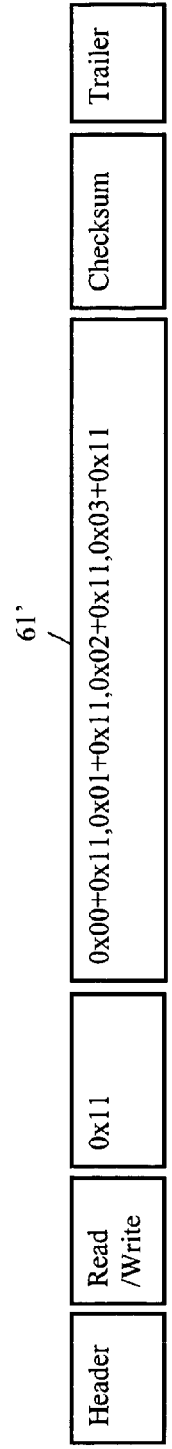
Figure 8C:
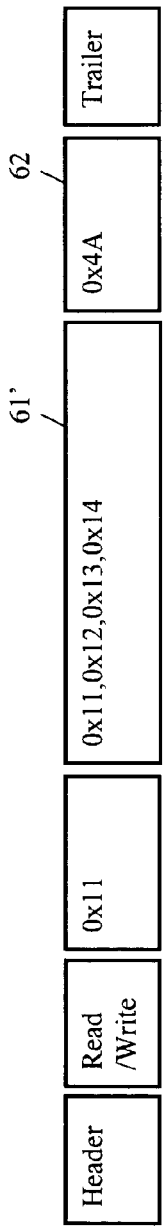

FIGS. 8A to 8C are diagrams illustrating a method of generating a file I/O command 30 including a command section according to an example of the present invention. Referring to FIG. 8A, a file I/O command 30 in a packet structure may include a header 58, a read/write flag 59, a trailer 63 and a payload 600 further including an encoding parameter 60, a command section 61 and a checksum 62. Each of the encoding parameter 60, command section 61 and checksum 62 may include at least one hexadecimal value. The command section 61 may be parsed so as to identify whether a controller command is contained. If confirmed, the controller command may be retrieved and parsed so as to identify the command type of the controller command, that is, the resource, control or data command. If no controller command is contained, the file I/O command may be recognized as one for data access between the first computing device 1 or the second computing device 2 and the bridge 22.

The command section 61, {0x00, 0x01, 0x02, 0x03}, may be encoded by the AP module 20a or 20b using the encoding parameter 60, 0x11. In the present example, the encoding may be performed by adding the encoding parameter 60 and the command section 61, i.e., {0x11+0x00, 0x11+0x01, 0x11+0x02, 0x11+0x03} as shown in an encoded section 61' of FIG. 8B, resulting in the encoded command section 61', {0x11, 0x12, 0x13, 0x14}, as illustrated in FIG. 8C. Furthermore, the checksum 62 is calculated as follows.

$$0x11+0x12+0x13+0x14=0x4A$$

Figure 9A:
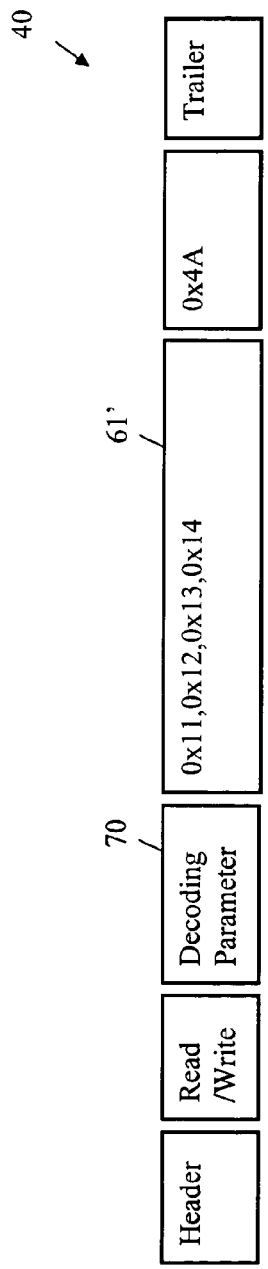
FIGS. 9A to 9C are diagrams illustrating a method of retrieving the command section from the file I/O command illustrated in FIG. 4C.
Figure 9B:
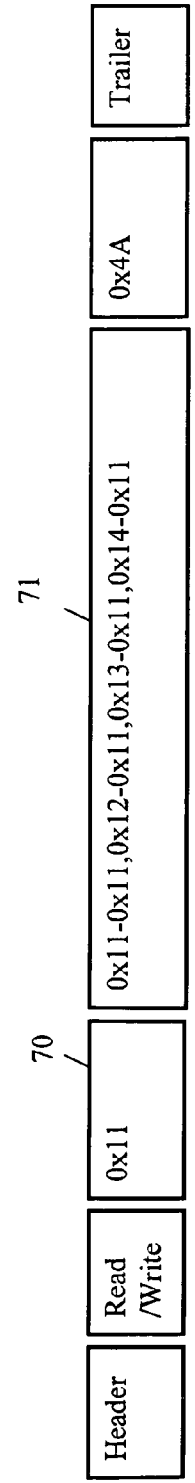
Figure 9C:
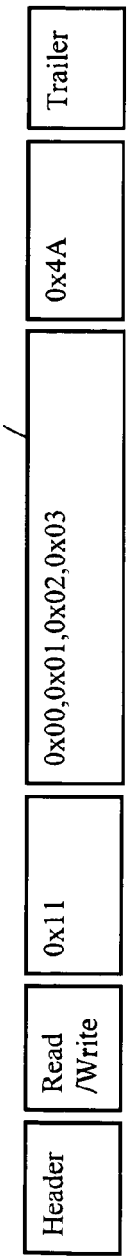

FIGS. 9A to 9C are diagrams illustrating a method of retrieving the command section from the file I/O command illustrated in FIG. 8C. Referring to FIG. 9A, a file I/O command 40 may be similar to the file I/O command 30 illustrated in FIG. 8C except that, for example, a decoding parameter field 70 replaces the encoding parameter field 60.

The encoded command section 61' may be decoded by using the decoding parameter 70 having a value equal to the encoding parameter 60, that is, 0x11. In the present example, the decoding may be performed by subtracting the decoding parameter 70 from the encoded command section 61', i.e., {0x11-0x11, 0x12-0x11, 0x13-0x11, 0x14-0x11} as shown in a section 71 of FIG. 9B, resulting in the retrieved command section 61, {0x00, 0x01, 0x02, 0x03}, as illustrated in FIG. 9C.

Figure 10A:
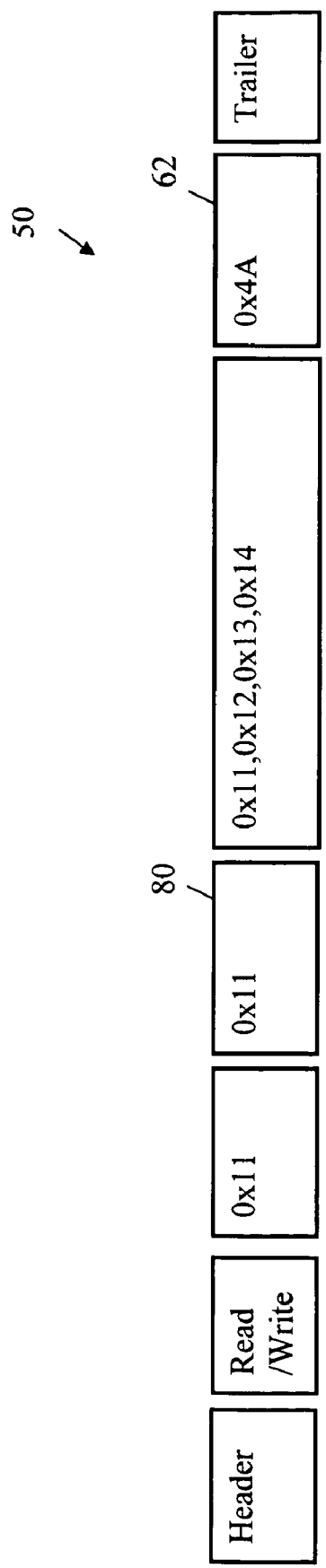
FIGS. 10A and 10B are diagrams illustrating a method of generating a file I/O command including a command section according to another example of the present invention.
Figure 10B:
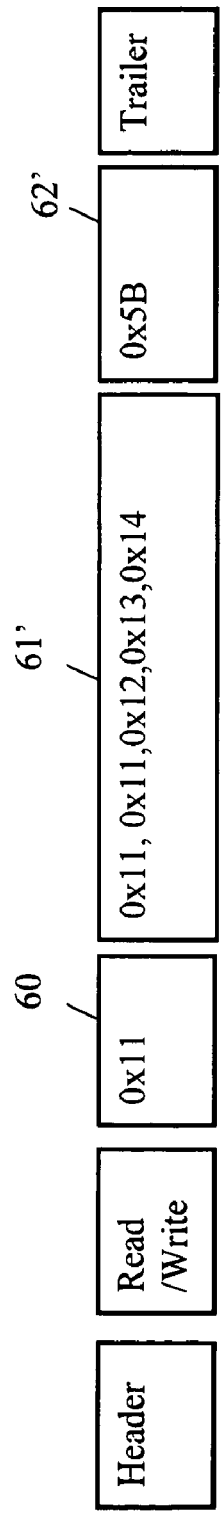

FIGS. 10A and 10B are diagrams illustrating a method of generating a file I/O command 50 including a command section according to another example of the present invention. Referring to FIG. 10A, the file O/A command may be similar to that illustrated in FIG. 8C except that, for example, a check byte 80 may be added.

The check byte 80, e.g., 0x11, may be added with the checksum 62, 0x4A, resulting in a new checksum 62', 0x5B, as illustrated in FIG. 10B.

To retrieve the controller command, the value of the check byte, i.e., 0x11, may be subtracted from the new checksum 62' and the value of the encoding parameter 60 may be subtracted from the encoded command section 61'.

Figure 11A:
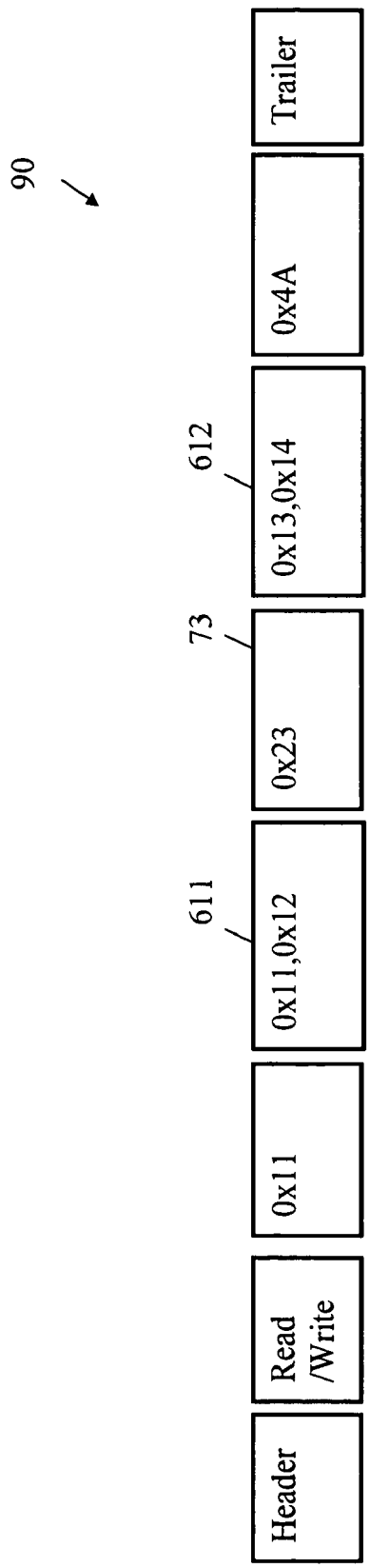
FIGS. 11A and 11B are diagrams illustrating a method of generating a file I/O command including a command section according to still another example of the present invention.
Figure 11B:
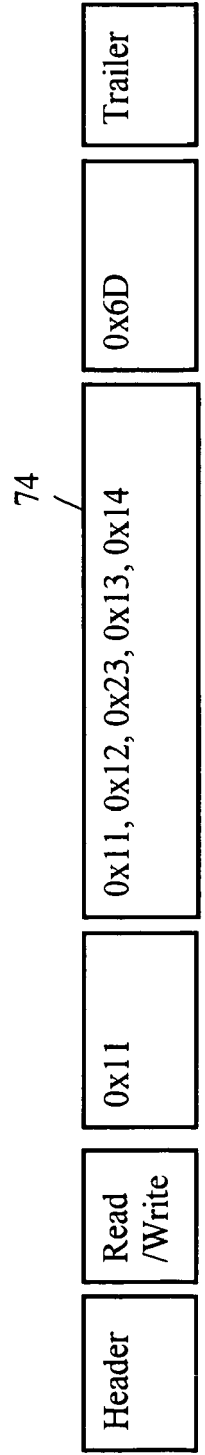

FIGS. 11A and 11B are diagrams illustrating a method of generating a file I/O command 90 including a command section according to still another example of the present invention. Referring to FIG. 11A, the file I/O command may be similar to that illustrated in FIG. 8C except that, for example, the encoded command section 61' of FIG. 8C may be divided into a first portion 611, {0x11, 0x12}, and a second portion 612, {0x13, 0x14}. Furthermore, another checksum 73 may be added. The value of the checksum 73, {0x23}, may be determined by adding the values of the first portion 611, {0x11+0x12}.

By combining entries of the first portion 611, the second portion 612 and the checksum 73, a new encoded command section 74, {0x11, 0x12, 0x23, 0x13, 0x14}, may be produced as illustrated in FIG. 11B.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A bridge for communications between a first computing device and a second computing device in a data communication system, the bridge comprising:
    a first interface to couple with the first computing device;
    a second interface to couple with the second computing device; and
    a control module configured to process a file input/output (I/O) command from the first computing device so as to allow the first computing device to have an access to at least one of data or resource of the second computing device via the first and second interfaces, the control module further comprising:
        a parser configured to identify whether the file I/O command includes an encoded controller command and to retrieve the encoded controller command from the file I/O command if the file I/O command includes an encoded controller command and configured to identify whether the encoded controller command includes a resource command to allow the first computing device to have access to the resource of the second computing device;
        a decoder configured to decode the encoded controller command so as to retrieve a controller command if the file I/O command includes the encoded controller command;
        a microprocessor configured to respond to a first polling signal from the first computing device and a second polling signal from the second computing device;
        a storage device to buffer the controller command and store at least one of the data of the second computing device or parameters regarding the resource of the second computing device to be accessed by the first computing device: and
    wherein the microprocessor configured to respond to the second polling signal to request the second computing device to send the parameters regarding the resource or a function device of the second computing device to the storage device and to respond to the first polling signal to request the first computing device to read the parameters stored in the storage device when the controller command is retrieved.

2. The bridge of claim 1, wherein each of the first and second interfaces includes one of a USB interface, an IEEE 1394 interface, a PCI Express interface and a SATA interface.

3. The bridge of claim 1, wherein the parser is configured to identify whether the encoded controller command includes a data command to allow the first computing device to have access to the data of the second computing device.

4. The bridge of claim 3, wherein the microprocessor requests the second computing device to write data to the storage device in response to the second polling signal and requests the first computing device to read the data stored in the storage device in response to the first polling signal.

5. The bridge of claim 3, wherein the microprocessor requests the first computing device to write data to the storage device in response to the first polling signal and requests the second computing device to read the data stored in the storage device in response to the second polling signal.

6. The bridge of claim 1, wherein the microprocessor requests the first computing device to send to the storage device predetermined parameters regarding a function device of the second computing device in response to the first polling signal and requests the second computing device to read the predetermined parameters stored in the storage device in response to the second polling signal.

7. The bridge of claim 1, wherein the parser is configured to identify whether the encoded controller command includes a control command to allow the first computing device to control at least a hardware function of the bridge.

8. The bridge of claim 1, wherein the first computing device is allowed to read data from the storage device if the file I/O command includes no encoded controller command.

9. The bridge of claim 1, wherein the first computing device is allowed to write data to the storage device if the file I/O command includes no encoded controller command.

10. A bridge for communications between a first computing device and a second computing device in a data communication system, the bridge comprising:
   a parser configured to identify whether a file input/output (I/O) command from the first computing device includes an encoded controller command, and to recognize the type of the encoded controller command as one of a data command, a resource command and a control command, wherein the data command allows the first computing device to have access to data of the second computing device, the resource command allows the first computing device to have access to a resource of the second computing device, and the control command to allow the first computing device to control at least a hardware function of the bridge;
   a decoder configured to decode the encoded controller command so as to retrieve a controller command if the file I/O command includes the encoded controller command;
   a storage device to buffer the controller command and to store at least one of the data of the second computing device or parameters regarding the resource of the second computing device to be accessed by the first computing device; and
   a microprocessor coupled to the parser to receive the file I/O command, coupled to the decoder to receive the controller command, and configured to respond to a first polling signal from the first computing device and a second polling signal from the second computing device,
   wherein the microprocessor is further configured to request the second computing device to send the parameters regarding the resource or a function device thereof to the storage device in response to the second polling signal and requests the first computing device to read the parameters stored in the storage device in response to the first polling signal device when the controller command is retrieved.

11. The bridge of claim 10, wherein the microprocessor requests the second computing device to write data to the storage device in response to the second polling signal and requests the first computing device to read the data stored in the storage device in response to the first polling signal.

12. The bridge of claim 10, wherein the microprocessor requests the first computing device to write data to the storage device in response to the first polling signal and requests the second computing device to read the data stored in the storage device in response to the second polling signal.

13. The bridge of claim 10, wherein the microprocessor requests the first computing device to send predetermined parameters regarding a function device of the second computing device to the storage device in response to the first polling signal and requests the second computing device to read the predetermined parameters stored in the storage device in response to the second polling signal.

14. The bridge of claim 10, wherein the first computing device is allowed to read data from the storage device if the file I/O command includes no encoded controller command.

15. The bridge of claim 10, wherein the first computing device is allowed to write data to the storage device if the file I/O command includes no encoded controller command.

\* \* \* \* \*